UNITED STATES PATENT OFFICE 2,278,909

METHOD OF REMOVING MUD BARRIERS FROM OIL WELLS

Theodore A. Bertness, Whittier, Norris Johnston, Alhambra, and Daniel O. Newton, La Habra Heights, Calif., assignors to Socony-Vacuum Oil Company, Incorporated, New York, N. Y., a corporation of New York No Drawing. Application March 11, 1941, Serial No. 382,759

1 Claim. (Cl. 166—24)

When oil wells are drilled through the producing formation in the customary manner, with the use of an aqueous mud fluid, it commonly occurs that a mud sheath is left on the wall of the hole. The drilling fluid adjacent porous formations is likely to lose water by absorption and thus to become densely packed and consolidated, forming a barrier to the subsequent flow of oil into the hole.

It is customary to remove as much of this barrier as possible before putting the well on production, as for example by simple washing through the perforations with streams of water, by the use of acid (which tends to flocculate the cake) and by the use of water softening agents.

None of these treatments appears to be fully successful, and I propose a novel treatment consisting in replacing the water of the mud sheath with an oil-soluble, nonaqueous wetting agent which will weaken the sheath structurally by making it an oil-wet rather than a water-wet agglomeration of solid particles.

The agent proposed for this purpose is tetrachlorethane ($CHCl_2 \cdot CHCl_2$) which is a highly efficient preferential wetting agent for clays and other aluminum silicates, and capable of substantially completely dislodging and replacing the water existing in the mud sheath. In applying this material the well is filled with the liquid in that portion from which the mud sheath is to be removed and is allowed to stand for several hours or until the agent has disappeared. As tetrachlorethane is much heavier than water, a water column may be placed over it to balance formation pressure or to cause a slow movement of the agent toward the formation surrounding the well.

After the agent has exercised the effect described, the well is cleaned out and in most cases it will be found that the mud wall is so softened and loosened by displacement of the water that it will be washed into the well by inflowing oil from the formation.

We claim as our invention:

The method of removing mud barriers from oil wells which comprises: removing drilling fluid from said well; filling a desired portion of the bore of said well with tetrachlorethane; allowing the well to stand until said tetrachlorethane has substantially been absorbed by said mud barrier, and cleaning out said well.

THEODORE A. BERTNESS.
NORRIS JOHNSTON.
DANIEL O. NEWTON.